May 23, 1933.　　　S. McK. HALL　　　1,910,795
DEMOUNTABLE WHEEL
Filed March 26, 1932　　　3 Sheets-Sheet 1
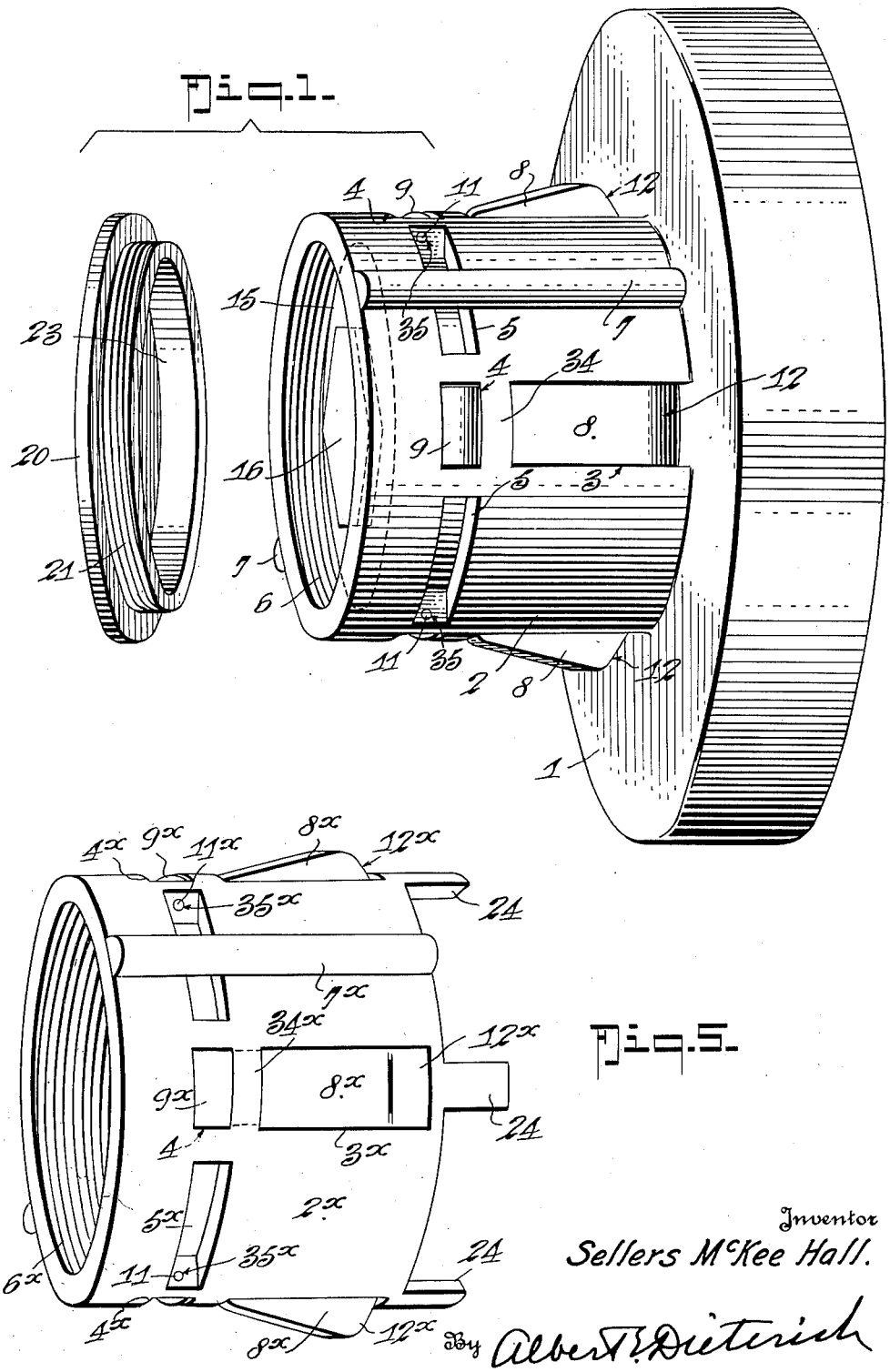
Inventor
Sellers McKee Hall.
By Albert F. Dieterich
Attorney

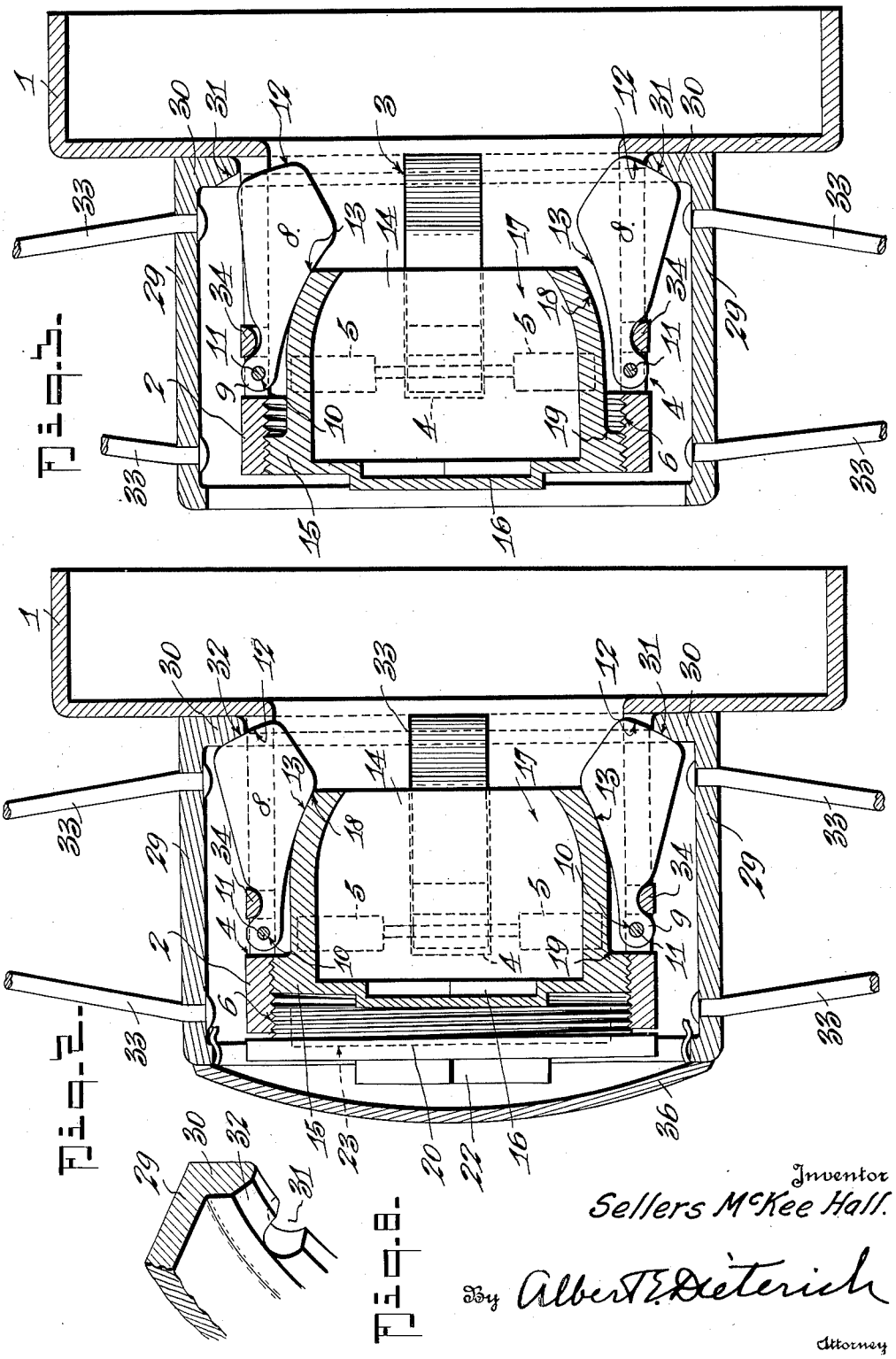

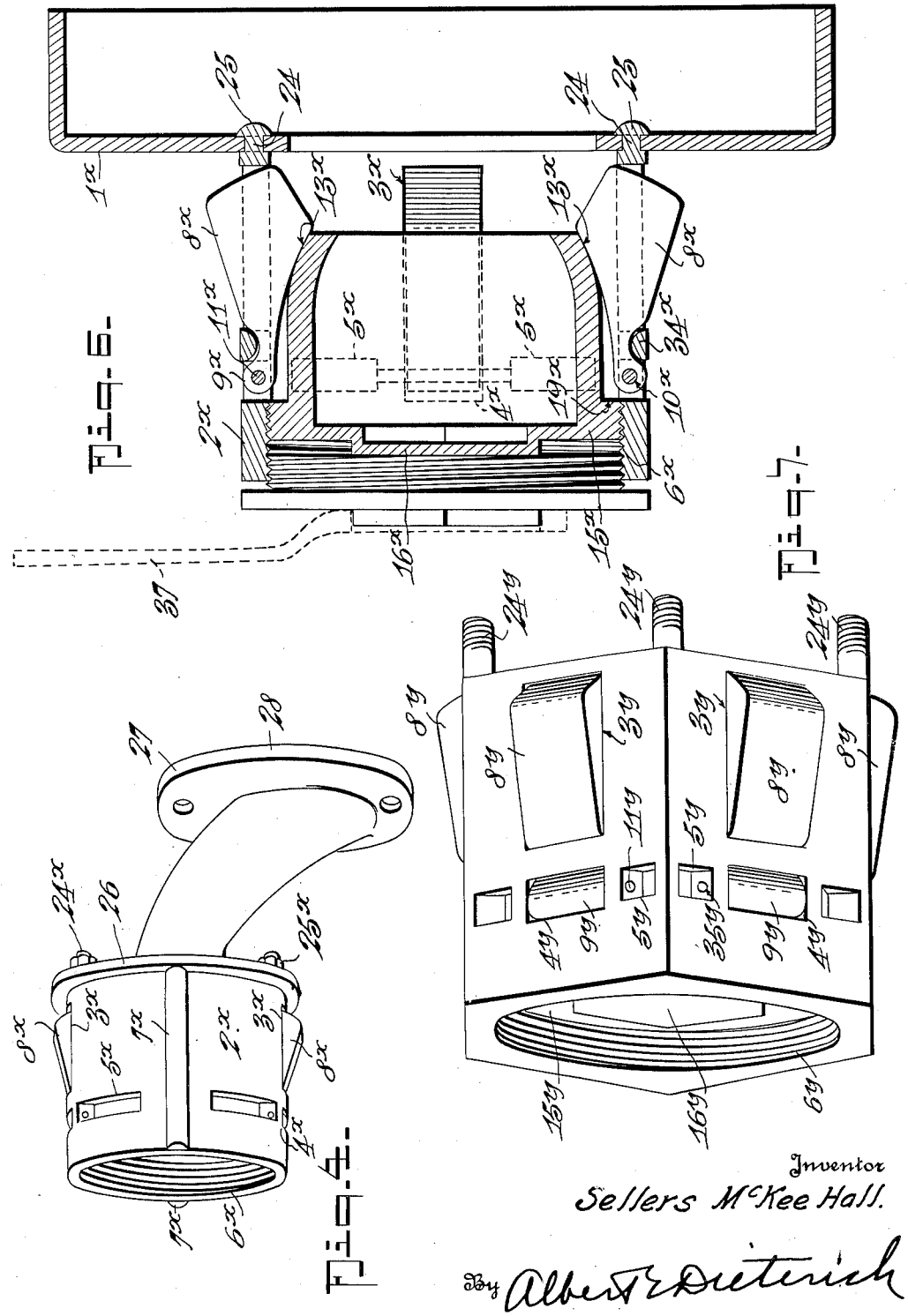

Patented May 23, 1933

1,910,795

UNITED STATES PATENT OFFICE

SELLERS McKEE HALL, OF PITTSBURGH, PENNSYLVANIA, ASSIGNOR OF ONE-FIFTH TO RALPH F. SMITH, OF PITTSBURGH, PENNSYLVANIA

DEMOUNTABLE WHEEL

Application filed March 26, 1932. Serial No. 601,386.

My invention relates to wheels for trucks, automobiles and vehicles of similar types, and particularly to that type of vehicle where the bolts and nuts used to hold the wheels onto the hubs are enclosed.

More particularly, my invention relates to means for securing the wheel onto the hub, the latter remaining on the vehicle when the wheel is removed. The wheel in the present-day structures is generally secured in place by bolt or stud and nut devices.

Primarily the invention has for its object to provide a new and improved way of securing the wheel to the hub without the use of bolts and nuts or studs and nuts, and to make the operation of demounting and remounting the wheel easy and rapid.

Further, the invention includes a wheel mounting means which can be employed for demountably securing a wheel on the spare wheel holder of an automobile.

Further, it is an object to provide a new and improved demountable wheel assembly which is rugged in construction, comparatively inexpensive to manufacture, and will hold the wheel in place with such force that it will not work loose or creep and become noisy.

Another object is to provide an attachment or adapter by which my invention may be applied to the present types of demountable wheels—wire, disk or wood spoke wheels.

Other objects of my invention will in part be obvious and in part be pointed out hereinafter.

To the attainment of the aforesaid objects and ends, the invention still further resides in the novel details of construction, combination and arrangement of parts, all of which will be first fully described in the following detailed description, and then be particularly pointed out in the appended claims, reference being had to the accompanying drawings, in which:—

Figure 1 is a perspective view of a hub from which the wheel has been removed, the structure embodying my invention.

Figure 2 is a vertical section taken axially through the hub and wheel with the parts in the assembled position.

Figure 3 is a similar view with the parts in the position for releasing the wheel.

Figure 4 is a detail perspective view of a spare tire holder with my invention applied.

Figure 5 is a perspective view of a hub attachment or adapter to be applied to the hub drums of old machines; also to be used on the spare wheel carrier bracket.

Figure 6 is a vertical section showing the same applied to the hub drum of an old style wheel.

Figure 7 is a perspective view of a modified form of the invention showing a hub of angular tubular form, as shown in Figure 1.

Figure 8 is a detail perspective view of a portion of the wheel ring flange.

In the drawings in which like numerals of reference indicate like parts in all of the figures, 1 represents the hub drum and 2 the hub cylinder which, when my invention is comprised in new equipment, will be an integral structure. (That is to say, the hub drum and hub cylinder are made in one piece.)

The hub is provided with a set (preferably three or more) of longitudinal wing-slots 3 and an equal number of wing pivot-openings 4. Windows 5 are provided at the sides of the openings 4 so that the pivot pins 11 can be conveniently inserted in assembling the parts. The tubular hub 2 is internally threaded as at 6 and is provided on its exterior with one or more (preferably a plurality) longitudinal guide-key protuberances 7.

8 designates what I call wings. These wings lie in the slots 3 and have necks terminating in heads 9 that lie in the openings 4 and are pierced at 10 to receive the pivot pins 11 which also pass through the openings 35 in the wall of the hub 2, thereby pivotally mounting the wings on the hub. Each wing 8 has a beveled wedging face 12 on its outer side and a cam face 13 on its inner side.

The wings are extended or expanded by means of a wedge plug 14 whose threaded head 15 is screwed into the threaded bore 6 of the hub 2. The head of the wedge plug 14 is provided with means by which the plug may be screwed. (For purposes of illustration a nut portion 16 is shown.) The wedge plug 14 is chambered as at 17 to reduce its weight and it has a spherical or curved surface 18 to cooperate with the cam faces 13 of the wedge wings.

The wedge plug 14 is under-cut or recessed as at 19 so as not to engage with the heads 9 of the wings.

A plug cap 20 is screwed to the hub 2 after the usual plug 14 is in place and serves as a lock nut or jam nut therefor. The cap 20 has a threaded portion 21 and is recessed at 23 to lighten it.

It is also provided with means by which it may be turned; for instance, a nut portion 22. (A suitable wrench 37 is provided to fit the nut portions 16 and 22 so that the members 14 and 20 may be easily turned.)

In the embodiment of my invention illustrated in Figure 5 it will be seen that the hub 2x is provided with lugs 24 which may be passed through correspondingly shaped holes in the drum, 1x, and riveted over as at 25. All parts in Figure 5 which are of corresponding form and function to those in Figure 1 bear the same reference numerals plus the index letter "x," and a repetition of the description of these parts is therefore thought to be unnecessary.

The hub 2x of Figure 5 may also be used on the bracket of the spare wheel carrier. This bracket 27 has a flange 28 which is permanently bolted to the machine and has a disk 26 through which the lugs 24 are passed and secured by riveting over as in Figure 6, or all the lugs may be threaded and provided with nuts as shown at 24x and 25x in Figure 4.

Instead of having the hub of circular cross section it may be of angular cross section; such, for example, as hexagonal. Such a form is shown in Figure 7. In this figure all parts which correspond to like parts in other embodiments bear the same reference numeral plus the index letter "y," so that a more detailed description of the construction shown in Figure 7 would be but repetition and is therefore omitted.

The flange 30 of the wheel-center ring 29 has notches 31 for the protuberances 7. It also has a beveled seat 32 against which the wedge faces 12 of the wings engage to hold the wheel-center ring and the structure carried thereby in place on the hub. The spokes 33 of the wheel are attached to the ring 29 (wire spokes being indicated in Figure 2, though disk or wooden spokes can be used if desired).

34 designates wing stops to prevent the wings dropping out of the wing slots when the wheel with its center-ring 29 is removed.

36 is the usual quick detachable cover cap that snaps into the end of the center-ring 29 when the wheel has been placed on the hub so as to cover the parts contained within the ring and prevent dirt accumulating therein.

When it is desired to remove a wheel all that is necessary is to take off the cap 36, unscrew the plug cap 20 and loosen (but not remove) the wedge plug 14. The wedge plug is unscrewed far enough to permit the wedge wings to enter the hub sufficiently for the flange 30 to clear them.

After the wheel shall have been replaced the wedge plug 14 is screwed tight again, the hub cap 20 is replaced and the cover 36 put on.

The operation of removing and replacing a wheel which employs my invention is but the work of a few seconds after having jacked up the axle to clear the wheel from the ground. There are no small nuts or bolts to become lost as in the old style wheel assemblies.

If desired, the caps 20 and 36 may be made as one, i. e. to serve both as the dust cap and as a lock nut or jam nut over the head 15 of the wedge plug 14.

From the foregoing description taken in connection with the accompanying drawings it is thought that the construction, operation and many advantages of my invention will be manifest to those skilled in the art.

What I claim is:

1. In a demountable wheel, a relatively fixed tubular hub, a wheel-center ring fitted over said hub and having an internal flange with a seat, said hub having longitudinal slots, retractable and extensible wings located in said slots, said wings having faces to engage with said flange seat, said hub having an internally threaded portion, a wedge plug having a portion threaded into said hub and having wing engaging portions formed to extend the wings when the plug is screwed in, means by which said wedge plug may be screwed, said hub having a key-like protuberance and said flange having a notch to receive the same, said wings being pivoted at their outer ends to said tubular hub and the engaging faces of said wings and said seat being so inclined to the axes of said hub and said ring that when said wedge plug is released the outward movement of said wheel-center ring in withdrawing it from said hub will automatically contract said wings into said hub.

2. In a demountable wheel, a relatively fixed tubular hub, a wheel-center ring fitted over said hub and having an internal flange with a seat, said hub having longitudinal slots, retractable and extensible wings located in said slots and pivoted therein at their outer ends, said wings having faces to engage with said flange seat, said hub having an internally threaded portion, a wedge plug having a portion threaded into said hub and having wing engaging portions formed to extend the wings when the plug is screwed in, means by which said wedge plug may be screwed, said hub being angular in cross section and said flange having its opening correspondingly angular.

3. In a demountable wheel, a relatively fixed tubular hub, a wheel-center ring fitted over said hub and having an internal flange with a seat, said hub having longitudinal slots, retractable and extensible wings located in said slots and pivotally mounted at their outer ends on said tubular hub, said wings having faces to engage with said flange seat, said hub having an internally threaded portion, a wedge plug having a portion threaded into said hub and having wing engaging portions formed to extend the wings when the plug is screwed in, means by which said wedge plug may be screwed, and means to prevent swiveling of said ring on said hub.

4. In a demountable wheel, a relatively fixed tubular hub, a wheel-center ring fitted over said hub and having an internal flange with a seat, said hub having longitudinal slots, retractable and extensible wings located in said slots and pivoted therein at their outer ends, said wings having faces to engage with said flange seat, said hub having an internally threaded portion, a wedge plug having a portion threaded into said hub and having wing engaging portions formed to extend the wings when the plug is screwed in, means by which said wedge plug may be screwed, and means to prevent swiveling of said ring on said hub, said wing engaging portion comprising a spherical-section surface.

5. In a demountable wheel, a relatively fixed tubular hub, a wheel-center ring fitted over said hub and having an internal flange with a seat, said hub having longitudinal slots, retractable and extensible wings located in said slots and pivotally mounted at their outer ends on said tubular hub, said wings having faces to engage with said flange seat, said hub having an internally threaded portion, a wedge plug having a portion threaded into said hub and having wing engaging portions formed to extend the wings when the plug is screwed in, means by which said wedge plug may be screwed, and means to prevent swiveling of said ring on said hub, said hub having wing stops for the purposes described.

6. In a demountable wheel, a drum having a tubular protuberance having slots, a wheel-center ring fitted over said protuberance, said ring and said protuberance having engaging portions which hold them against relative rotation on their axes, expanding wedge elements mounted at their outer ends in the slots of said protuberance to engage with said ring and force it into engagement with said drum, and a wedge-element expander threaded into said protuberance.

7. In a demountable wheel, a drum having a tubular protuberance, a wheel-center ring fitted over said protuberance, said ring and said protuberance having engaging portions which hold them against relative rotation on their axes, expanding wedge elements carried by said protuberance to engage with said ring and force it into engagement with said drum, a wedge-element expander threaded into said protuberance, and a plug-cap also threaded into said protuberance after the expander for the purposes described.

8. In a demountable wheel, a drum having a cylindrical protuberance, a wheel-center ring fitted over said protuberance and having an inwardly projecting flange adjacent the drum, means to prevent swivelling of the wheel-center ring on said protuberance, said protuberance having a set of longitudinal slots, a set of expanding wings located in said slots with their outer ends hinged to said protuberance and their inner ends each provided with a surface to engage said flange and hold the same against said drum, said inner ends of said wings each also having a cam surface, a tubular wedge element threaded at its outer end into said protuberance and having a spherical inner end to engage said cam surfaces to expand said wings.

9. In a demountable wheel, a drum having a cylindrical protuberance, a wheel-center ring fitted over said protuberance, said ring and said protuberance having engaging portions operative throughout the length of said protuberance to hold them against relative rotation on their axes, wings carried by said protuberance to engage with said ring, said wings being pivoted at their outer ends to said protuberance and with their inner ends engaging said ring to force it inwardly against said drum, said wings having their inner surfaces inclined from their pivoted ends toward the axis of the wheel and a wing expander threaded into said protuberance and comprising a tubular body having a curved end to engage said inner surfaces of said wings at a point intermediate their ends whereby the wedging pressures will be applied in lines of direction making an angle of approximately 45 degrees to the axis of the wheel.

10. In a demountable wheel, a drum having a cylindrical protuberance, a wheel-center ring fitted over said protuberance, said ring and said protuberance having engaging portions operative throughout the length of said protuberance to hold them against relative rotation on their axes, wings carried by said protuberance to engage with said ring, said wings being pivoted at their outer ends to said protuberance and with their inner ends engaging said ring to force it inwardly against said drum, said wings having their inner surfaces inclined from their pivoted ends toward the axis of the wheel, a wing expander threaded into said protuberance and comprising a tubular body having a curved end to engage said inner surfaces of said wings at a point intermediate their ends whereby the wedging pressures will be applied in lines of direction making an angle of approximately 45 degrees to the axis of the wheel, and a plug-cap also threaded into said protuberance after said expander for the purposes described.

11. In a demountable wheel, a drum having a cylindrical protuberance, a wheel-center ring having an internal flange at its inner end, said protuberance and said flange having interlocking parts to prevent swivelling and effective throughout substantially the length of said protuberance, said inwardly projecting flange having an annular inclined seat, said protuberance having longitudinal slots, wings hinged at their outer ends in said slots and having their inner ends provided with outer inclined faces and inner arcuate faces, the latter lying closer to the pivotal axes of the wings than the former, a hollow expander threaded into said protuberance and having an arcuate surface to cooperatively engage said inner arcuate faces and expand said wings to force said wheel-center ring into engagement with said drum, all being arranged so that when said expander is released the act of pulling said wheel-center ring from said drum will automatically contract said wings into said protuberance.

SELLERS McKEE HALL.